(12) United States Patent
Moattar-Aliabadi et al.

(10) Patent No.: US 11,119,794 B2
(45) Date of Patent: *Sep. 14, 2021

(54) MOBILE APPLICATION ACTIVITY DETECTOR

(71) Applicant: Google LLC, Mountain View, CA (US)

(72) Inventors: Roxanna Moattar-Aliabadi, San Francisco, CA (US); Arpana Hosabettu, San Jose, CA (US); Ajay Ananth Krishna, San Jose, CA (US); Tal Max Akabas, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 16/707,754

(22) Filed: Dec. 9, 2019

(65) Prior Publication Data

US 2020/0110622 A1    Apr. 9, 2020

Related U.S. Application Data

(63) Continuation of application No. 15/436,167, filed on Feb. 17, 2017, now Pat. No. 10,572,280.

(51) Int. Cl.
*G06F 8/38* (2018.01)
*G06F 9/451* (2018.01)
(Continued)

(52) U.S. Cl.
CPC ............. *G06F 9/452* (2018.02); *G06F 8/38* (2013.01); *G06F 9/451* (2018.02); *G06F 9/54* (2013.01); *H04L 67/42* (2013.01)

(58) Field of Classification Search
CPC ..................................... G06F 8/61; G06F 8/65
See application file for complete search history.

(56) References Cited

U.S. PATENT DOCUMENTS 8,972,525 B1    3/2015 Ramachandran
10,042,684 B2 *  8/2018 Cook .................... G06Q 10/06
(Continued)

FOREIGN PATENT DOCUMENTS

CN    101243399    8/2008
CN    103257863    8/2013
(Continued)

OTHER PUBLICATIONS

EP Office Action in European Application 17740143.7, dated Dec. 2, 2019, 2 pages.

(Continued)

*Primary Examiner* — Duy Khuong T Nguyen
(74) *Attorney, Agent, or Firm* — Fish & Richardson P.C.

(57) ABSTRACT

The subject matter of this specification generally relates to detecting events that occur within mobile applications without modifying code of the mobile application. In some implementations, a front-end server receives, from a mobile application management application installed on a client device, interaction data specifying (i) a user interaction identifier for a user interaction with an interactive item that presents, at a first mobile application, content for a second mobile application and (ii) an interactive item identifier. The front-end server receives event data specifying an occurrence of a specified user action within the second mobile application and the interactive identifier for the interactive item. A back-end server determines that the specified user action resulted from the user interaction based on a match between the interactive item identifier specified by the event data and the interactive item identifier that links to the user interaction identifier for the user interaction.

18 Claims, 3 Drawing Sheets

(51) Int. Cl.
*G06F 9/54* (2006.01)
*H04L 29/06* (2006.01)

(56) References Cited

U.S. PATENT DOCUMENTS

| | | | |
|---|---|---|---|
| 10,275,421 B1 | 4/2019 | Clark | |
| 10,735,533 B2* | 8/2020 | Aliabadi | H04L 67/28 |
| 2011/0288913 A1 | 11/2011 | Waylonis et al. | |
| 2012/0278182 A1* | 11/2012 | Kamath | G06Q 30/00 |
| | | | 705/14.72 |
| 2014/0101248 A1 | 4/2014 | Felder | |
| 2014/0236742 A1 | 8/2014 | Sakuma | |
| 2014/0278853 A1 | 9/2014 | Brown et al. | |
| 2015/0215383 A1 | 7/2015 | Sun | |
| 2016/0086215 A1 | 3/2016 | Wang | |
| 2016/0098783 A1 | 4/2016 | Margalit | |

FOREIGN PATENT DOCUMENTS

| | | |
|---|---|---|
| JP | 2013-80319 | 5/2013 |
| JP | 2015-69398 | 4/2015 |
| JP | 2015-79302 | 4/2015 |
| JP | 2015-148954 | 8/2015 |
| KR | 10-2013-0113309 | 10/2013 |
| WO | WO 2014/159921 | 10/2014 |

OTHER PUBLICATIONS

CN Office Action in Chinese Application No. 201780000546.9, dated Dec. 4, 2020, 13 pages (with English translation).

IN Office Action in Indian Application No. 201847004257, dated Dec. 21, 2020, 5 pages.

'developers.facebook.com' [online] "Measure Installs and In-App Conversions," [retrieved on Dec. 16, 2016] Retrieved from Internet URL<https://developers.facebook.com/docs/app-ads/measuring/installs-and-in-app-conversions> 3 pages.

'support.google.com' [online] "Track Android app conversions," [retrieved on Feb. 17, 2017] Retrieved from Internet URL<https://support.google.com/adwords/answer/6255257?hl=en#in_app_purchases> 11 pages.

'www.help.tune.com' [online] "An Introduction to Mobile App Attribution," Last Update Oct. 19, 2015 [Retrieved on Feb. 17, 2017] Retrieved from Internet URLhttps://help.tune.com/marketing-consule/an-introduction-to-mobile-app-attribution> 9 pages.

International Preliminary Report on Patentability issued in International Application No. PCT/US2017036302, dated Feb. 15, 2019, 16 pages.

International Search Report and Written Opinion issued in International Application No. PCT/US2017/036302, dated Nov. 16, 2017, 13 pages.

JP Office Action in Japanese Application No. 2017-556915, dated May 7, 2019, 13 pages (with English translation).

JP Office Action in Japanese Application No. 2017-556915, dated Sep. 2, 2019, 5 pages (with English translation).

KR Office Action issued in Korean Application No. 10-2017-7031384, dated Oct. 1, 2018, 13 pages (with English translation).

JP Office Action in Japanese Application No. 2020-000784, dated Mar. 15, 2021, 4 pages (with English translation).

* cited by examiner

MOBILE APPLICATION ACTIVITY DETECTOR

CROSS-REFERENCE TO RELATED APPLICATIONS

This application is a continuation application of, and claims priority to, U.S. patent application Ser. No. 15/436,167, titled "MOBILE APPLICATION ACTIVITY DETECTOR," filed on Feb. 17, 2017. The disclosure of the foregoing application is incorporated herein by reference in its entirety for all purposes.

BACKGROUND

A mobile application is an application designed to run on a mobile device, such as a smartphone or tablet computer. Some common mobile applications include games, productivity applications, business applications, and news and information applications. A native application is an application (e.g., mobile application) designed to run on a particular type of device or a particular platform. Some platforms require the installation of software development kits (SDKs) in applications designed to run on those platforms. An SDK can provide additional functionality for the application.

SUMMARY

This specification describes systems, methods, devices, and techniques for detecting user-initiated events that occur within a mobile application and correlating the events with other events without modifying the application's code.

In general, one innovative aspect of the subject matter described in this specification can be implemented in a system for detecting user-initiated events within a mobile application without modifying code of the application. The system can include one or more front-end servers that receive, from a mobile application management application installed on a client device of a user, interaction data specifying (i) a user interaction identifier for a user interaction with an interactive item that presents, at a first mobile application, content for a second mobile application installed on the client device and (ii) an interactive item identifier that was submitted to the mobile application management application by the second mobile application in response to the user interaction with the interactive item. The front-end server(s) can store, in a data storage device, a data entry that links the interactive item identifier to the user interaction identifier based on the receipt of the interaction data. The front-end server(s) can receive, from the mobile application management application, event data specifying (i) an occurrence of specified user action within the second mobile application after the user interaction with the interactive item and (ii) the interactive identifier for the interactive item. The system can include one or more back-end servers that determine that the specified user action resulted from the user interaction with the interactive item based on a match between the interactive item identifier specified by the event data and the interactive item identifier that links to the user interaction identifier for the user interaction with the interactive item in the data storage device being detected. The back-end server(s) can provide, to the front-end server(s), data indicating that the specified user action resulted from the user interaction with the interactive item, wherein the one or more front-end servers update a user interface to indicate that the specified user action resulted from the user interaction with the interactive item. Other implementations of this aspect include corresponding apparatus, methods, and computer programs, configured to perform the actions of the methods, encoded on computer storage devices.

These and other implementations can optionally include one or more of the following features. In some aspects, the event was initiated by user interaction with a user interface of the second mobile application subsequent to the user interaction with the interactive item at the first mobile application.

In some aspects, the user interaction data includes a device identifier for the client device. The event data can include the device identifier for the client device. The one or more back-end servers can determine that the event resulted from the user interaction with the interactive item based further on the device identifier of the user interaction data matching the device identifier of the event data.

In some aspects, the one or more back-end servers determine that the event resulted from the user interaction with the interactive item based further on a time at which the user interaction with the interactive item occurred and a time at which the event occurred. The one or more back-end servers can identify multiple data entries that include a link between the interactive item identifier and one or more user interaction identifiers and determine that the event resulted from the user interaction with the interactive item based on a time at which the user interaction with the interactive item occurred being more recent than at time for each of the one or more user interaction identifiers.

In some aspects, the second mobile application includes a web browser application that presents the interactive item. The event can include a purchase of a product or service using the second mobile application. The interactive item can present content related to the product or service. The event data can include at least one of (i) price for the product or service, (ii) an identifier for the product or service, or (iii) a type of purchase.

Particular embodiments of the subject matter described in this specification can be implemented so as to realize one or more of the following advantages. In-app events that occur within a mobile application can be detected and correlated with corresponding events that occur outside the application without modifying code of the application, e.g., without adding and SDK to, or modifying an SDK of, the mobile application. By correlating the events without modifying the application's code, an application developer does not have to update code of the mobile application each time new events are to be detected or correlated or when rules for detecting or correlating events are modified. For example, without the use of the techniques described in this document, an application developer would not be able to detect new types of in-app events or correlate the new types of in-app events with corresponding events that occur outside the mobile application without modifying the code of each mobile application installed on each mobile device on which the mobile application is installed. As updating the code for applications, or updating the applications themselves, is computationally expensive (e.g., requiring many CPU cycles and substantial amount of network bandwidth) for each mobile device that is updated, the techniques described in this document can save an application developer a significant amount of time, computing resources, and demand on network resources.

Installing an update to a mobile application to include an updated SDK also significantly burdens the computing resources of mobile devices. For example, downloading the update from a mobile network can monopolize the mobile device's transceiver preventing the mobile device from downloading or transmitting other data (e.g., interfering with use of the mobile device) and drain the mobile device's battery. The storage of code used to update the mobile application can consume a significant amount of the mobile device's limited memory. Thus, avoiding updates to a mobile application to allow for the detection of in-app events can improve the performance of the mobile device by improving battery life, reducing the demand placed on processors and network devices, and allowing the mobile device to perform other actions (e.g., making the mobile device available for use by a user).

Updating a mobile application also involves a long and rigid process of code development and testing. By minimizing the number of application updates, e.g., by not requiring updates for detecting new in-app events or using new rules to detect in-app events, the amount of development and testing can be reduced. Further, even when testing has been completed, bugs in updated code may only be identified after the updated code has been deployed, which can lead to mobile application downtime.

Various features and advantages of the foregoing subject matter is described below with respect to the figures. Additional features and advantages are apparent from the subject matter described herein and the claims.

DESCRIPTION OF DRAWINGS

Like reference numbers and designations in the various drawings indicate like elements.

DETAILED DESCRIPTION

In general, systems and techniques described herein can detect in-app events that occur within a mobile application and correlate the events with corresponding events (e.g., events that occur outside the mobile application) without modifying the code of the mobile application. For example, the techniques described in this document allows for the detection and correlation of in-app events without installing a new SDK or modifying an existing SDK of the mobile application. New or modified events, types of events, and/or rules for correlating events can be used to detect and correlate events without modifying code of the mobile application. The correlating can include identifying an event that occurred outside the mobile application, but led to an event initiated by a user in the mobile application.

In some implementations, a mobile application management application executing on a client device can obtain data describing events that occur outside a mobile application and within the mobile application. This data can then be used to correlate an event that occurred outside of the mobile application with an event that occurred within, or using, the mobile application. For example, an interactive item that depicts content for a mobile application may be presented on a web page or in a different mobile application. When the interactive item receives an interaction (e.g., a selection) on a mobile device, the mobile device may open the mobile application management application so that the user can download the application (if the mobile application is not installed on the mobile device) or perform an action related to the mobile application (e.g., download content to the mobile application or download an add-on to the application). The mobile application management application can receive, from the different mobile application, an identifier for the interactive item and a unique identifier for the user interaction. The mobile application management application can send this data to a mobile application management system which links the identifier for the interactive item with the unique identifier for the user interaction.

If the user performs a specified user action within the mobile application (e.g., at a user interface of the mobile application) after the user interaction with the interactive item, the mobile application management application can receive data regarding the specified user action. For example, if the user downloads the content or an add-on to the mobile application, the mobile application management application can send data identifying the interactive item and data describing the specified user action to the mobile application management system. The mobile application management system can then correlate the specified user action with the user interaction with the interactive item based at least on the link between the unique identifier for the user interaction and the identifier for the interactive item.

Figure 1:
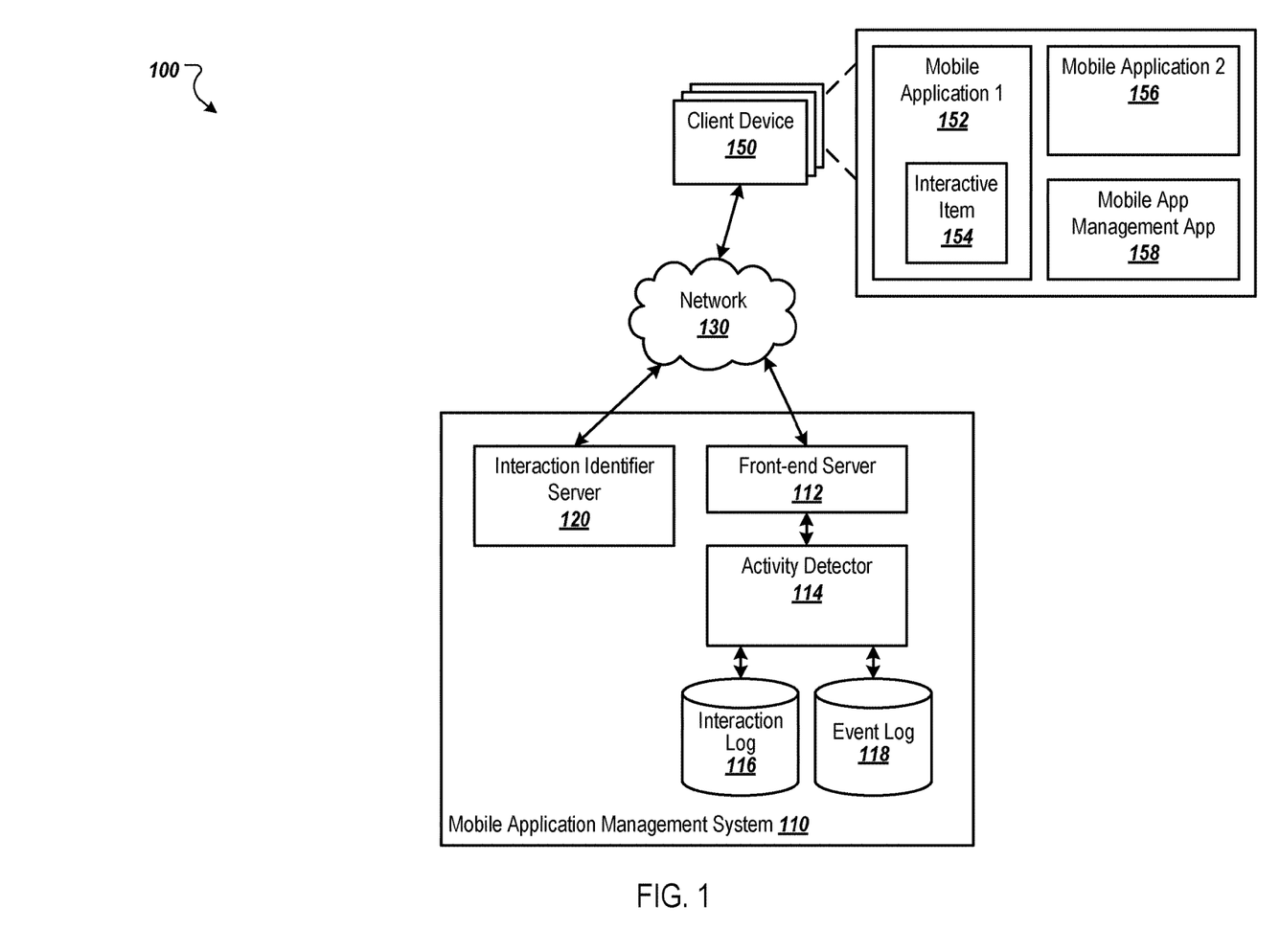
FIG. 1 is an example environment in which a mobile application management system detects events that occur within a mobile application and correlates the event with other events without modifying code of the application.

FIG. 1 is an example environment 100 in which a mobile application management system 110 detects events that occur within a mobile application and correlates the event with other events without modifying code of the application. The example environment 100 includes mobile application management system 110 that communicates with client devices 150 over a data communication network 130, e.g., a local area network (LAN), a wide area network (WAN), the Internet, a mobile network, or a combination thereof.

The client devices 150 can include smartphones, tablet computers, wearable devices (e.g., smartwatches), in-car computing devices, and/or other types of mobile devices. The client devices 150 include mobile applications, such as the mobile application 152 and the mobile application 156, and a mobile application management application 158. Of course, the client devices 150 can include other numbers of mobile applications. The mobile applications can include web browser applications, game applications, retailer applications, news and information applications, productivity applications, fitness applications, music applications, movie and video streaming applications, and so on.

The mobile application management application 158 allows the client devices 150 to download mobile applications to the client devices, update mobile applications installed on the client devices 150, purchase products for the mobile applications, download content to the mobile applications, and/or perform other actions with respect to mobile applications. For example, a game application may allow users to obtain items for the game, download upgrades or add-ons to the game, or unlock additional functionality for the game via the mobile application management application 158. The user can initiate these actions within the mobile application (e.g., by interacting with a user interface of the mobile application) and the mobile application can cause the client device 150 to open the mobile application management application 158 to complete the action. For example, if an action requires making a purchase from an application developer, the mobile application management application 158 can obtain approval or payment information from the user and complete the purchase with the application developer. An application server of the application developer can then provide the items to the application, unlock the functionality within the application, etc.

Mobile applications can present interactive items that link to (or can cause the mobile application to download a link to) another mobile application or a particular location within another mobile application (e.g., using a deep link). An interactive item is a content item that can be presented on electronic resources (e.g., web pages and mobile applications) and when interacted with cause a client device that is presenting the interactive item to navigate to another electronic resource. Example content items include electronic advertisements, promotions, free offers, and links to download mobile applications. For example, the mobile application 152 may be a web browser application that presents a web page with an interactive item 154. The interactive item 154 may depict content related to the mobile application 156. For example, the interactive item 154 may depict content related to an action (e.g., download an add-on or unlock functionality) that can be performed in the mobile application 156. The interactive item 154 may be presented in an interactive item slot, such as a banner, that are reserved portions of a web page or application page for presenting an interactive item.

When a user interacts with the interactive item 154, the mobile application 152 may cause the client device 150 to open the mobile application management application 158 so that the user of the client device 150 can complete the action related to the content depicted by the interactive item 154. If the mobile application 156 is not installed on the client device 150, the mobile application management application 158 may prompt the user to download the mobile application 156. If the mobile application 156 is installed on the client device 150, the mobile application management application 158 may prompt the user to authorize the action related to the interactive item. For example, the interactive item 154 may depict an offer to download an add-on to the mobile application 156. In this example, the mobile application management application 158 may prompt the user to approve the download of the add-on to the mobile application 158 installed on the client device 150 based on the data describing the action.

The interactive item 154 can include a link to an interaction identifier server 120 of the mobile application management system 110. When a user interacts with the interactive item 154, the mobile application 152 may identify the link and send a request to the interaction identifier server 120 in response to identifying the link. The request may include data that specifies an interactive item identifier for the interactive item 154. For example, each interactive item may have a unique identifier. Each instance of the interactive item may include the unique identifier. For example, the same interactive item may be presented at multiple mobile applications, on multiple different web pages, and/or to different users. Each instance of the interactive item at each of the different applications and web pages can include the same unique identifier for the interactive item.

The interaction identifier server 120 can provide navigational data to the mobile application 152 based on the interactive item identifier for the interactive item 154. The navigational data can specify the mobile application 156 at which the action related to the content depicted by the interactive item 154 can be completed. The navigational data can also include data that causes the mobile application 152 to open the mobile application management application 158 to facilitate completion of the action. In some implementations, the navigational data includes data describing the action related to the interactive item 154. For example, the data describing the action may include data specifying content to be downloaded, an add-on to be downloaded, functionality to be unlocked, items to be added to a game application, a purchase amount for the action, and/or other appropriate data regarding the action. This interaction identifier server 120 can identify this data describing the action based on the unique identifier for the interactive item 154. In some implementations, the mobile application management application 158 may obtain the data describing the action from another server, e.g., from a server of an application developer, by providing the interactive item identifier to the other server.

The interaction identifier server 120 can also provide a unique user interaction identifier to the mobile application 152 in response to the request. The unique user interaction identifier uniquely identifies the user interaction with the interactive item 154. For example, each user interaction with the same interactive item 154 or the same instance of the same interactive item 154 may have a unique user interaction identifier that is different from the user interaction identifier for each other user interaction with the interactive item.

The mobile application 152 can receive the navigational data and the user interaction identifier from the interaction identifier server 120. For example, the interaction identifier server 120 may provide the data in the form of a Universal Resource Location (URL) or a Universal Resource Identifier (URI) with parameters that specify the data. The mobile application 152 can use the navigational data to open the mobile application management application 158 so that the user can download the mobile application 156 and/or authorize the action related to the interactive item 154. The mobile application 152 can also provide to the mobile application management application 158 data specifying the interactive item identifier for the interactive item 154 and the user interaction identifier received from the interaction identifier server 120. The mobile application management application 158 can store both identifiers and/or send both identifiers to a front-end server 112 of the mobile application management system 110.

The front-end server 112 can provide the received interactive item identifier for the interactive item 154 and the user interaction identifier for the user interaction with the interactive item 154 to an activity detector 114, which may be implemented using one or more servers (e.g., one or more back-end servers). The activity detector 114 can store, in an interaction log 116, a data entry that links the user interaction identifier with the interactive item identifier for the interactive item 154. In some implementations, the activity detector 114 may also store, with the data entry, a time at which the user interaction occurred, an application identifier for the mobile application 152 at which the interaction occurred, and application identifier for the mobile application 156 to which the interactive item links, and/or a device identifier for the client device 150. For example, the mobile application management application 158 may send this data to the front-end server 112 with the interactive item identifier for the interactive item 154 and the user interaction identifier.

If/when the user authorizes the action related to the content depicted by the interactive item 154 using the mobile application management application 158, the mobile application management application 158 can provide event data that specifies the occurrence of the action and the interactive item identifier for the interactive item 154 to the front-end server 112. The mobile application management application 158 can provide this data even if the user does not initially authorize the action after interacting with the interactive item 154. For example, the user may allow the mobile application management application 158 to download the mobile application, but may decide not to download an add-on, buy items, or complete another type of action. Similarly, if the mobile application 158 was already installed on the client device 150 when the user interaction occurred, the user may still decide not to complete the action.

The user may later decide to initiate and complete the action using the mobile application 156. For example, if the mobile application 156 is a game application and the action is to download an add-on for the game application, the user may open the mobile application 156 and initiate the download of the add-on using a user interface of the game application. To complete the download, the mobile application 156 may open the mobile application management application 158 to obtain approval from the user and/or payment for the add-on from the user. When the approval or payment is received, the mobile application management application 158 can send event data describing the action (e.g., type of action, name of action, name of items, add-on, or functionality downloaded or purchased, payment information, etc.), the interactive item identifier for the interactive item 154, an identifier for the mobile application 152 at which the interaction occurred, an identifier for the mobile application 156, and/or a device identifier for the client device 150 to the front-end server 113. The front-end server 112 can provide the received event data and the interactive item identifier to the activity detector 114.

To facilitate providing an interactive item identifier for later completed actions, the mobile application management application 158 may store interactive item identifiers received by the mobile application management application 158 in response to user interactions with interactive items at the client device 150. For example, each time an interactive item receives a user interaction that causes the mobile application management application 158 to be opened to facilitate the download of an application or the completion of an action, the mobile application management application 158 may store the interactive item identifier for the interactive item. The mobile application management application 158 may also store a time stamp for each interactive item. The time stamp may specify a time at which the user interaction occurred. In this way, the mobile application management application can assign the interactive item identifier for the interactive item most recently interacted with to the action. When the mobile application management application 158 sends the event data to the front-end server 112, the mobile application management application 158 can provide the interactive item identifier for the interactive item most recently interacted with to the action with the event data.

The activity detector 114 can store, in an event log 118, a data entry that includes the event data, the interactive item identifier for the interactive item 154, an identifier for the mobile application 152 at which the interaction occurred, an identifier for the mobile application 156, and/or a device identifier for the client device 150. The activity detector 114 can use at least a portion of this data to correlate the action specified by the event data to a user interaction with an interactive item. For example, the activity detector 114 can use the data to determine which user interaction with an interactive item resulted in the action being completed. In this way, the activity detector 114 can track action completion or conversion rates for interactive items.

In some implementations, the activity detector 114 uses one or more rules to correlate events that occur within a mobile application (e.g., specified actions completed within the application) with other events (e.g., user interactions with interactive items). For example, a rule may specify that a particular type of conversion occurs when a user interaction with a particular interactive item occurs and a particular specified action occurs at the same device (or at different devices with the same user logged into the different devices) within a threshold amount of time. Absent the techniques described in this document, each time a new rule was added to correlate new types of events or each time a rule was modified, code of each mobile application at which the event was to be detected would have to be updated. Using the techniques described in this document, the activity detector 114 can manage the one or more rules and use the one or more rules to correlate the events based on data received from the mobile application management application 158. Instead of modifying each mobile application to add or modify rules, only the activity detector 114 has to be updated. In some instances where new data has to be captured by the mobile application management application 158, the mobile application management application 158 can be updated without modifying the mobile applications.

In some implementations, the activity detector 114 correlates events based on the interactive item identifiers of the events. As described above, the interaction log 116 includes data entries that links interactive item identifiers to user interaction identifiers for user interactions. The activity detector 114 can use the interaction item identifier included in event data for a specified action completed within a mobile application to identify data entries of the interaction log that include the same interaction item identifier. In this way, the activity detector 114 can filter, for the specified action, the data entries to those that have the same interactive item identifier to determine which user interaction with the interactive item identified by the interactive item identifier resulted in the specific action being completed.

In some implementations, if the interaction log 118 includes only a single data entry that links the interactive item identifier to a user interaction identifier, the activity detector 114 may determine that the user interaction identified by the user interaction identifier resulted in the specified action of the event data being performed. In response, the activity detector 114 may correlate the user interaction identified by the user interaction identifier with the specified action.

The activity detector 114 may also update statistics for the interactive item based on the correlation. For example, the activity detector 114 may update, for the interactive item, a rate at which the specified action is completed after the interactive item receives a user interaction. These statistics can then be provided to an entity for which the interactive item is distributed. For example, the activity detector 114 may update a user interface of the entity to reflect the updated statistics, e.g., in response to the entity accessing an application or web page that presents the statistics.

In some implementations, the activity detector 114 uses additional data to correlate user interactions with interaction items with specified actions completed within mobile applications. For example, the activity detector 114 may use an application identifier that identifies the mobile application at which the user interaction occurred and/or a device identifier that identifies a client device at which the user interaction occurred to correlate a user interaction with a specified action. The activity detector 114 can identify data entries in the interaction log 116 and data entries in the event log that have the same interactive item identifier and the same application identifier and/or same device identifier. In this example, the activity detector 114 may not correlate a user interaction with the same interactive item made by one user with a specified action completed by a different user.

In some implementations, the interaction identifier server 120 and/or activity detector 114 are part of a different system or require different accounts from a system that manages the download of mobile applications and updates to the applications. For example, an application developer may have a first account with a mobile application management system that manages the download of mobile applications developed by the application developer. The mobile application management system may also manage the download of add-ons, the purchase of items and unlocked functionality for the applications, etc. The application developer may also have a second account with an interactive item distribution system that distributes interactive items related to the developer's mobile applications and manages statistics for the interactive items. In this example, the mobile application management application may provide interaction data for user interactions with interactive items and event data for specified actions that occur within mobile applications to the interactive item distribution system.

In some implementations, the application developer may be requested to, or required to, link the two accounts to obtain statistics for in-app events that include correlations between specific actions that occur within the developer's mobile application and user interactions with the developer's interactive items. In this way, sensitive data such as purchase amounts resulting from user interactions with the interactive items remain private to the developer.

Figure 2:
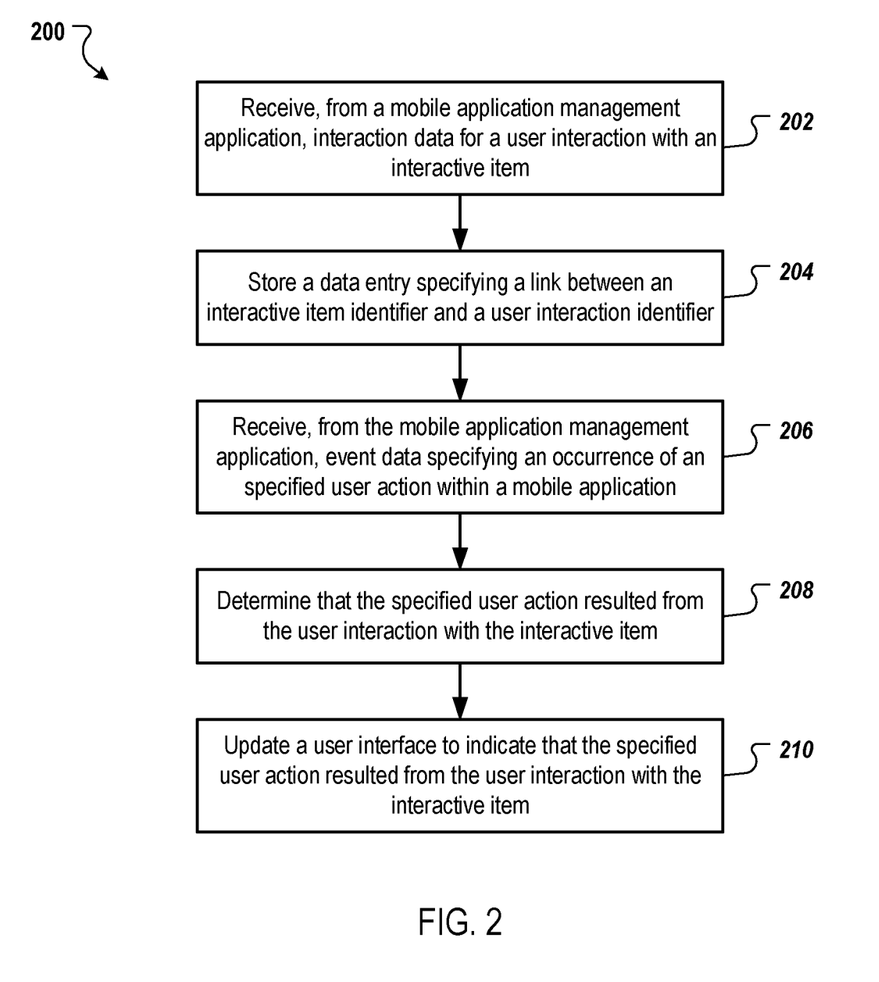
FIG. 2 is a flowchart of an example process for detecting an event within an application without modifying code of the application.

FIG. 2 is a flowchart of an example process 200 for detecting an event within an application and correlating the event with another event without modifying code of the application. Operations of the process 200 can be implemented, for example, by a system that includes one or more data processing apparatus, such as the mobile application management system 110 of FIG. 1. The process 200 can also be implemented by instructions stored on computer storage medium, where execution of the instructions by a system that includes a data processing apparatus cause the data processing apparatus to perform the operations of the process 200.

The system receives interaction data for a user interaction with an interactive item (202). The interaction data can specify a unique user interaction identifier for the user interaction with the interactive item. The interaction data can also include a unique interactive item identifier for the interactive item. The system may receive the interaction data from a mobile application management application installed on a client device at which the user interaction occurred.

For example, a user may interact with (e.g., select) an interactive item that is being presented by a first mobile application (e.g., a web browser application or another type of mobile application). The first mobile application may provide, in response to the user interaction, the unique interaction identifier and the interactive item identifier to the mobile application management application. In turn, the mobile application management application can provide the interaction data that includes the two identifiers to the system. In some implementations, the interaction data can also include a time at which the user interaction occurred, an application identifier for the mobile application at which the interaction occurred, an application identifier for the mobile application to which the interactive item links, and/or a device identifier for the client device at which the user interaction occurred.

The system stores, in a data storage device, a data entry specifying a link between the interactive item identifier and the user interaction identifier (204). The link indicates that the user interaction identifier identifies a user interaction with the interactive item identified by the interactive item identifier. The data entry can also include data specifying a time at which the user interaction occurred, an application identifier for the mobile application at which the interaction occurred, and application identifier for the mobile application to which the interactive item links, and/or a device identifier for the client device at which the user interaction occurred.

The system receives event data specifying an occurrence of a specified user action within a mobile application (206). The mobile application may be the mobile application to which the interactive item links. The specified user action may be the download of an add-on or upgrade to the mobile application, the unlocking of additional functionality of the mobile application, the purchase of items for the mobile application, or another appropriate action initiated or approved by a user of the mobile application.

The specified user action may occur after the user interaction with the interactive item. For example, the user may select the interactive item and, in response, be presented a user interface that enables the user to complete the action or download the mobile application. The user may complete the action at this time or immediately after downloading the mobile application. Or, the user may complete the action at a later time, e.g., hours, days, or weeks later.

The specified user action may be completed using the mobile application management application installed on the user's client device. When the specified user action is completed, the mobile application management application can provide the event data to the system. The event data can include data describing the specified user action (e.g., type of action, name of action, name of items, add-on, or functionality downloaded or purchased, payment information, etc.), the interactive item identifier for the interactive item, an identifier for the mobile application at which the interaction occurred, an identifier for the mobile application, and/or a device identifier for the client device at which the specified action occurred.

The system determines that the specified user action within the mobile application resulted from the user interaction with the interactive item (208). In some implementations, the system may use the received interaction data and the received event data to determine that the user interaction with the interactive item led to the specified user action. For example, the system may identify one or more data entries stored in the data storage device that links a user interaction to the interactive item specified by the event data. If only one data entry links a user interaction to the interactive item specified by the event data, the system may determine that the user interaction of the data entry led to the specified user action.

If multiple data entries stored in the data storage device link a user interaction to the interactive item specified by the event data, the system may use additional criteria to determine which user interaction led to the specified user action. For example, the system may identify data entries that specify the same client device at which the specified action occurred, the same mobile device at which the specified action occurred, the same mobile application at which the specified action occurred, and/or the same mobile application at which the interactive item received a user interaction. In some implementations, the time at which the interactive item was selected as indicated by the data entries is used to determine which user interaction led to the specified user action. For example, it multiple data entries include the same data as the event data, the user interaction having a time of occurrence that is closest to a time at which the specified action occurred may be considered the user interaction that led to the specified action.

The system updates a user interface to indicate that the specified user action resulted from the user interaction with the interactive item (210). For example, the system may update statistics for the interactive item to indicate that this user interaction with the interactive item led to the specified action. In a particular example, the system may update a rate at which the specified action occurs or is completed after the interactive item receives a user interaction. These statistics can then be provided to an entity for which the interactive item is distributed. For example, the system may update a user interface of the entity to reflect the updated statistics, e.g., in response to the entity accessing an application or web page that presents the statistics.

Figure 3:
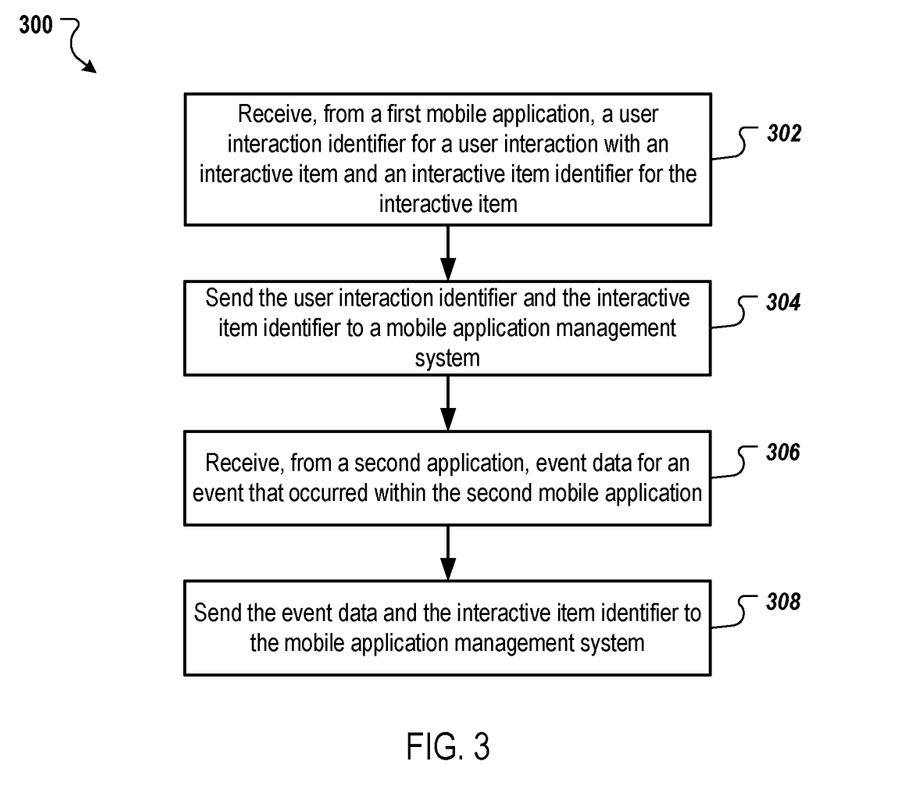
FIG. 3 is a flowchart of an example process for providing data describing an event to a mobile application management system.

FIG. 3 is a flowchart of an example process 300 for providing data describing an event to a mobile application management system. Operations of the process 300 can be implemented, for example, by a system that includes one or more data processing apparatus, such as the client device 150 of FIG. 1. The process 300 can also be implemented by instructions stored on computer storage medium, where execution of the instructions by a system that includes a data processing apparatus cause the data processing apparatus to perform the operations of the process 300.

The system receives a user interaction identifier for a user interaction with an interactive item and an interactive item identifier for the interactive item (302). For example, the interactive item may be presented by a first mobile application and link to a second mobile application. The identifiers may be received from a first mobile application at which the user interaction occurred. The first mobile application may provide the interactive item identifier to an interaction identifier server in response to the user interaction. In response, the interaction identifier server may provide a unique user interaction identifier for the user interaction with the interactive item to the first mobile application. The first mobile application can then provide the identifiers to a mobile application management application installed on the same client device at the first mobile application.

The system sends the user interaction identifier and the interactive item identifier to a mobile application management system (304). For example, the mobile application management application may send the identifiers and optionally other data, as described above, to the mobile application management system. In response, the mobile application management system may create a data entry that links the user interaction identifier to the interactive item.

The system receives event data for a specified user action that occurred in the second mobile application (306). For example, the second mobile application may provide data describing the specified user action, such as the type of action, name of action, name of items, add-on, or functionality downloaded or purchased, payment information, or other appropriate data to the mobile application management application.

The system sends the event data and the interactive item identifier to the mobile application management system (308). For example, the mobile application management application can send event data describing the, the interactive item identifier for the interactive item, an identifier for the mobile application at which the interaction occurred, an identifier for the mobile application, and/or a device identifier for the client device to the mobile application management system. The mobile application management system can use the received data to correlate the specified user action with a user interaction with the interactive item, as described above.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A method comprising:
receiving an event correlation rule defining a correlation between a user interaction with a given interactive item and a specified user action; and updating a performance measure for the given interactive item using the event correlation rule and without requiring modification of code of applications installed on client devices to update the performance measure, the updating comprising:
  receiving, from a given client device in response to an occurrence of the specified user action within a second application on the given client device, event data comprising (i) data indicating the occurrence of the specified user action within the second application and (ii) previous user interaction data comprising a given interactive item identifier that identifies the given interactive item that was presented in a first application different from the second application and that was interacted with by a user prior to the occurrence of the specified user action and a device identifier for the client device;
  comparing the previous user interaction data to multiple data entries that each link user interaction data comprising (i) a respective interactive item identifier and (ii) a respective device identifier to a corresponding user interaction identifier that uniquely identifies a user interaction, that occurred at a client device identified by the respective device identifier, with a respective interactive item that corresponds to the respective interactive item identifier;
  determining, based at least on the comparing, that the specified user action resulted from a given user interaction with the given interactive item within the first application based on a match between the previous user interaction data and user interaction data that links to a corresponding user interaction identifier;
  updating the performance measure for the given interactive item based on the determination that the specified user action resulted from the user interaction with the given interactive item; and
providing the updated performance measure for presentation.

2. The method of claim 1, further comprising:
receiving, from the given client device and prior to receiving the event data, interaction data specifying (i) a given user interaction identifier that uniquely identifies the user interaction with the interactive item within the first application and (ii) the given interactive item identifier that identifies the given interactive item, wherein the given client device sends the interaction data in response to a user interaction with the given interactive item within the first application, and wherein the given interactive item presents content for the second application; and
in response to receiving the interaction data, storing, as one of the multiple data entries, a data entry that links the given user interaction item identifier to the given interactive item identifier.

3. The method of claim 1, wherein:
each data entry includes a respective application identifier that uniquely identifies an application at which a user interaction with an interactive item occurred, the method further comprising:
  determining that the given interactive item identifier specified by the event data matches the respective interactive item identifier of multiple data entries;
  in response to determining that the given interactive item identifier specified by the event data matches the respective interactive item identifier of multiple data entries, comparing a given application identifier for the first application to the respective application identifier of each of the multiple data entries; and
  determining that the specified user action resulted from the given user interaction with the given interactive item within the first application comprises determining that the given application identifier matches the respective application identifier of at least one of the multiple data entries.

4. The method of claim 1, wherein receiving the event data comprises receiving the event data from a mobile application management application executing on the client device, and wherein the mobile application management application enables the user to download applications to the given client device.

5. The method of claim 4, wherein:
detection of user interaction with the interactive item causes the given client device to launch the mobile application management to download the second application; and
the specified user action comprises downloading the second application using the mobile application management application.

6. The method of claim 4, wherein:
detection of user interaction with the interactive item causes the given client device to launch the mobile application management to purchase content for the second application; and
the specified user action comprises completion of the purchase of the content for the second application using the mobile application management application.

7. A system comprising:
one or more data processing apparatus; and
a data storage medium storing instructions that, when executed by the data processing apparatus, cause the data processing apparatus to perform operations comprising:
  receiving an event correlation rule defining a correlation between a user interaction with a given interactive item and a specified user action; and
  updating a performance measure for the given interactive item using the event correlation rule and without requiring modification of code of applications installed on client devices to update the performance measure, the updating comprising:
    receiving, from a given client device in response to an occurrence of the specified user action within a second application on the given client device, event data comprising (i) data indicating the occurrence of the specified user action within the second application and (ii) previous user interaction data comprising a given interactive item identifier that identifies the given interactive item that was presented in a first application different from the second application and that was interacted with by a user prior to the occurrence of the specified user action and a device identifier for the client device;
    comparing the previous user interaction data to multiple data entries that each link user interaction data comprising (i) a respective interactive item identifier and (ii) a respective device identifier to a corresponding user interaction identifier that uniquely identifies a user interaction, that occurred at a client device identified by the respective device identifier, with a respective interactive item that corresponds to the respective interactive item identifier;

determining, based at least on the comparing, that the specified user action resulted from a given user interaction with the given interactive item within the first application based on a match between the previous user interaction data and user interaction data that links to a corresponding user interaction identifier;

updating the performance measure for the given interactive item based on the determination that the specified user action resulted from the user interaction with the given interactive item; and providing the updated performance measure for presentation.

8. The system of claim 7, wherein the operations comprise:

receiving, from the given client device and prior to receiving the event data, interaction data specifying (i) a given user interaction identifier that uniquely identifies the user interaction with the interactive item within the first application and (ii) the given interactive item identifier that identifies the given interactive item, wherein the given client device sends the interaction data in response to a user interaction with the given interactive item within the first application, and wherein the given interactive item presents content for the second application; and in response to receiving the interaction data, storing, as one of the multiple data entries, a data entry that links the given user interaction item identifier to the given interactive item identifier.

9. The system of claim 7, wherein:

each data entry includes a respective application identifier that uniquely identifies an application at which a user interaction with an interactive item occurred, the operations further comprising:

determining that the given interactive item identifier specified by the event data matches the respective interactive item identifier of multiple data entries;

in response to determining that the given interactive item identifier specified by the event data matches the respective interactive item identifier of multiple data entries, comparing a given application identifier for the first application to the respective application identifier of each of the multiple data entries; and determining that the specified user action resulted from the given user interaction with the given interactive item within the first application comprises determining that the given application identifier matches the respective application identifier of at least one of the multiple data entries.

10. The system of claim 7, wherein receiving the event data comprises receiving the event data from a mobile application management application executing on the client device, and wherein the mobile application management application enables the user to download applications to the given client device.

11. The system of claim 10, wherein:

detection of user interaction with the interactive item causes the given client device to launch the mobile application management to download the second application; and the specified user action comprises downloading the second application using the mobile application management application.

12. The system of claim 10, wherein:

detection of user interaction with the interactive item causes the given client device to launch the mobile application management to purchase content for the second application; and the specified user action comprises completion of the purchase of the content for the second application using the mobile application management application.

13. A non-transitory computer storage medium encoded with a computer program, the program comprising instructions that when executed by one or more data processing apparatus cause the data processing apparatus to perform operations comprising:

receiving an event correlation rule defining a correlation between a user interaction with a given interactive item and a specified user action; and updating a performance measure for the given interactive item using the event correlation rule and without requiring modification of code of applications installed on client devices to update the performance measure, the updating comprising:

receiving, from a given client device in response to an occurrence of the specified user action within a second application on the given client device, event data comprising (i) data indicating the occurrence of the specified user action within the second application and (ii) previous user interaction data comprising a given interactive item identifier that identifies the given interactive item that was presented in a first application different from the second application and that was interacted with by a user prior to the occurrence of the specified user action and a device identifier for the client device;

comparing the previous user interaction data to multiple data entries that each link user interaction data comprising (i) a respective interactive item identifier and (ii) a respective device identifier to a corresponding user interaction identifier that uniquely identifies a user interaction, that occurred at a client device identified by the respective device identifier, with a respective interactive item that corresponds to the respective interactive item identifier;

determining, based at least on the comparing, that the specified user action resulted from a given user interaction with the given interactive item within the first application based on a match between the previous user interaction data and user interaction data that links to a corresponding user interaction identifier;

updating the performance measure for the given interactive item based on the determination that the specified user action resulted from the user interaction with the given interactive item; and providing the updated performance measure for presentation.

14. The non-transitory computer storage medium of claim 13, wherein the operations comprise:

receiving, from the given client device and prior to receiving the event data, interaction data specifying (i) a given user interaction identifier that uniquely identifies the user interaction with the interactive item within the first application and (ii) the given interactive item identifier that identifies the given interactive item, wherein the given client device sends the interaction data in response to a user interaction with the given interactive item within the first application, and wherein the given interactive item presents content for the second application; and in response to receiving the interaction data, storing, as one of the multiple data entries, a data entry that links the given user interaction item identifier to the given interactive item identifier.

15. The non-transitory computer storage medium of claim 13, wherein:
   each data entry includes a respective application identifier that uniquely identifies an application at which a user interaction with an interactive item occurred, the operations further comprising:
      determining that the given interactive item identifier specified by the event data matches the respective interactive item identifier of multiple data entries;
      in response to determining that the given interactive item identifier specified by the event data matches the respective interactive item identifier of multiple data entries, comparing a given application identifier for the first application to the respective application identifier of each of the multiple data entries; and
   determining that the specified user action resulted from the given user interaction with the given interactive item within the first application comprises determining that the given application identifier matches the respective application identifier of at least one of the multiple data entries.

16. The non-transitory computer storage medium of claim 13, wherein receiving the event data comprises receiving the event data from a mobile application management application executing on the client device, and wherein the mobile application management application enables the user to download applications to the given client device.

17. The non-transitory computer storage medium of claim 16, wherein:
   detection of user interaction with the interactive item causes the given client device to launch the mobile application management to download the second application; and
   the specified user action comprises downloading the second application using the mobile application management application.

18. The non-transitory computer storage medium of claim 16, wherein:
   detection of user interaction with the interactive item causes the given client device to launch the mobile application management to purchase content for the second application; and
   the specified user action comprises completion of the purchase of the content for the second application using the mobile application management application.

\* \* \* \* \*